United States Patent
Massie et al.

[19]

[11] Patent Number: 6,066,942
[45] Date of Patent: May 23, 2000

[54] DC-TO-DC CONVERTER

[75] Inventors: Harold L. Massie, West Linn, Oreg.;
Viktor D. Vogman, Olympia, Wash.

[73] Assignee: Intel Corporation, Santa Clara, Calif.

[21] Appl. No.: 09/073,906

[22] Filed: May 6, 1998

[51] Int. Cl.$^7$ ...................................................... G06F 1/40
[52] U.S. Cl. ........................................... 323/271; 323/224
[58] Field of Search ..................................... 323/224, 225,
323/272, 271, 283, 287

[56] References Cited

U.S. PATENT DOCUMENTS

| | | | |
|---|---|---|---|
| 4,095,166 | 6/1978 | Shibata et al. | 363/131 |
| 4,853,837 | 8/1989 | Gulczynski | 363/80 |
| 5,428,524 | 6/1995 | Massie . | |
| 5,455,501 | 10/1995 | Massie . | |
| 5,534,771 | 7/1996 | Massie . | |
| 5,587,650 | 12/1996 | Massie . | |
| 5,623,198 | 4/1997 | Massie et al. . | |
| 5,627,413 | 5/1997 | Mughir et al. . | |
| 5,650,715 | 7/1997 | Massie . | |
| 5,666,281 | 9/1997 | Mandelcorn | 363/132 |
| 5,678,049 | 10/1997 | Massie . | |
| 5,710,699 | 1/1998 | King et al. | 363/132 |
| 5,764,047 | 6/1998 | Massie . | |
| 5,777,461 | 7/1998 | Massie et al. . | |
| 5,808,377 | 9/1998 | Massie et al. . | |
| 5,811,889 | 9/1998 | Massie . | |
| 5,822,166 | 10/1998 | Massie . | |
| 5,831,405 | 11/1998 | Massie . | |
| 5,845,141 | 12/1998 | Massie . | |
| 5,889,387 | 3/1999 | Massie . | |

*Primary Examiner*—Shawn Riley
*Attorney, Agent, or Firm*—Howard A. Skaist; Kenneth M. Seddon

[57] ABSTRACT

A DC-to-DC converter includes: a first and a second inductor path, the inductor paths being coupled in the converter so as to provide a single voltage output signal during converter operation. An array of switches are coupled so as to control the application of voltage sources to the inductor paths during converter operation. The switches and the array are coupled so that their states are controlled, at least in part, based upon the voltage signal level of the single voltage output signal during converter operation.

A method of producing a voltage signal is as follows. One of two voltage sources is applied to an inductor circuit to produce an output voltage signal. The voltage source supplied is switched based, at least in part, on the voltage signal level of the output voltage signal.

17 Claims, 2 Drawing Sheets

DC-TO-DC CONVERTER

BACKGROUND

1. Field

The present invention relates to voltage converters, and more particularly, to a direct-current (DC) to direct-current (DC) converters.

2. Background Information

Direct-current (DC) to direct-currents (DC) converters are well-known in the art. Such circuitry or devices are typically employed to convert from one DC voltage signal level to another DC voltage signal level. This may be useful in a variety of environments. A number of such converters are well-known. In one such converter, two input voltage sources provide energy where the energy available from each voltage source is limited. Typically, when it is desirable to convert energy produced by two voltage sources, two converters are employed. The output signals of these converters are typically coupled in parallel. Each of the two converters contains its own control circuit. The ratio between the two output powers produced is provided by a load sharing control circuit which contains a current sensing circuit and produces an error signal by comparing a signal proportional to the output current and a reference voltage. The load sharing control circuit amplifies the error signal and controls both converters so that their output currents follow a reference current level. To provide equivalence of the output power, a master-slave topology may be employed where the reference voltage represents a signal proportional to the master converter current. Such an approach is typically complex and, therefore, has an associated high cost with implementation. It would be desirable if a simpler and relatively cost effective approach to providing DC-to-DC conversion with two input voltage sources were available.

SUMMARY

Briefly, in accordance with one embodiment of the invention, a DC-to-DC converter includes: a first and a second inductor path, the inductor paths being coupled in the converter so as to provide a single voltage output signal during converter operation. An array of switches are coupled so as to control the application of voltage sources to the inductor paths during converter operation. The switches and the array are coupled so that their states are controlled, at least in part, based upon the voltage signal level of the single voltage output signal during converter operation.

Briefly, in accordance with another embodiment of the invention, a method of producing a voltage signal is as follows. One of two voltage sources is applied to an inductor circuit to produce an output voltage signal. The voltage source supplied is switched based, at least in part, on the voltage signal level of the output voltage signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following when read with the accompanying drawing in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have been described in detail so as not to obscure the present invention.

Figure 1:
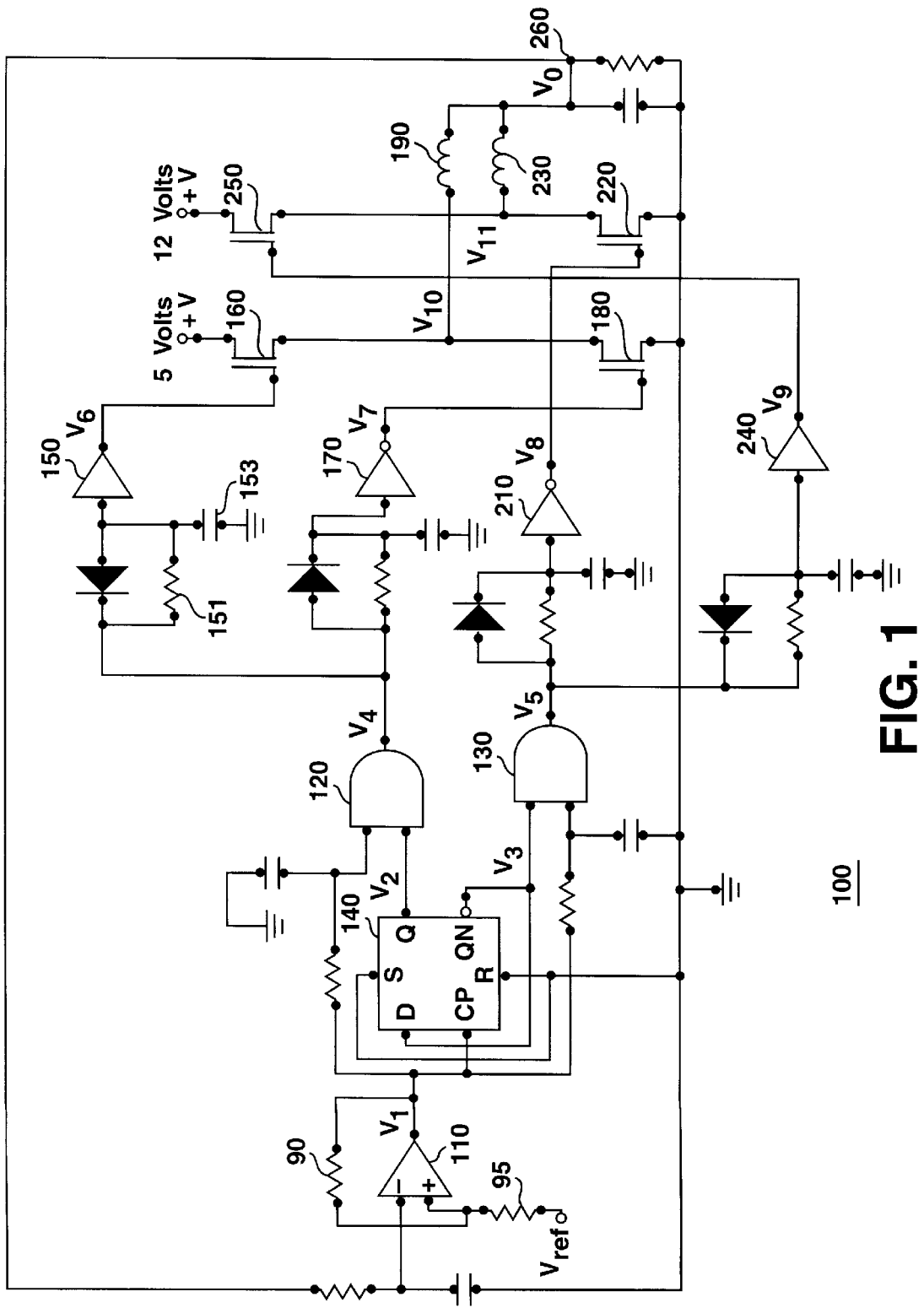
FIG. 1 is a circuit diagram illustrating an embodiment of a DC-to-DC converter in accordance with the present invention.
Figure 2:
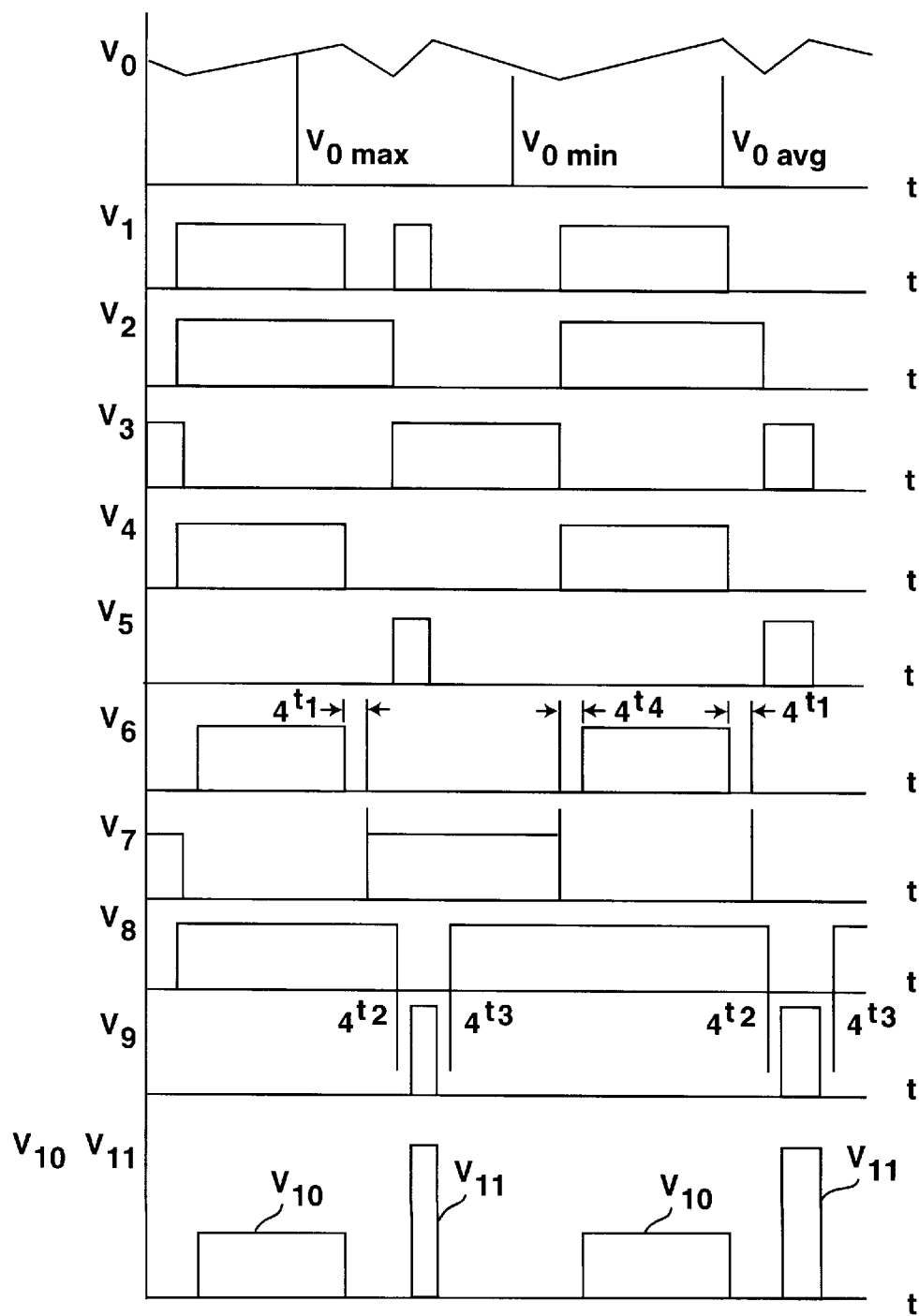
FIG. 2 is a series of plots illustrating a variety of voltage signals for the embodiment illustrated in FIG. 1.

FIG. 1 is a circuit diagram illustrating an embodiment 100 of a DC-to-DC converter in accordance with the present invention. FIG. 2 is a diagram illustrating a variety of signal timing plots corresponding to selected locations in the circuit diagram of FIG. 1. The output signal of comparator 110 is a control element for a ripple regulator, as described in more detail hereinafter. When the converter output voltage ($V_O$) at 260 is less than $V_{ref}$, the comparator output signal for comparator 110 transitions "high," enabling AND gates 120 and 130. It will, of course, be understood that the invention is not restricted in scope to particular binary digital signals referred to as "high" and "low". However, typically, these terms refer to binary digital signals in the form of voltage signals within well-known or well understood voltage tolerances. If the output signal provided at the Q port of flip-flop 140 is also high, then the output signal of AND gate 120, designated in this particular embodiment as V4, will also be high. After a time delay, determined at least in part by resistor 151 and capacitor 153, the input signal of field effect transistor (FET) driver 150 will exceed a predetermined threshold voltage, which enables the output signal of 150 to be high. This signal applied to the gate of transistor 160 effectively turns "on" the transistor, which results in power being applied from the voltage source, designated in this particular embodiment as 5 volts. The voltage level at the source of transistor 160 is designated V10. The relationship between $V_O$, V1, V2, V3 and V4 is illustrated in FIG. 2.

In this particular embodiment, the output port of AND gate 120 is also coupled to the input port of inverting FET driver 170, which causes V7 to be low. Synchronous rectifier transistor 180 is, therefore, turned "off" so that transistor 160 may provide current to the output voltage signal, $V_O$, through inductor 190. This is illustrated in FIG. 2 by the increase in the voltage $V_O$ during this period. Since the complementary Q output port of flip-flop 140, designated V3, is low during this period, the output signal of AND gate 130 is also low. The output signal of inverter 210, designated V8, is high, which holds synchronous rectifier FET 220 in an "on" state. Also, with voltage signal V5 low, the output signal of noninverting FET driver 240 is low so that FET 250 is off.

As previously described, the embodiment of a DC-to-DC converter illustrated in FIG. 1 may have a state in which power is delivered from a voltage source, such as five volts in this embodiment, through transistor 160 and inductor 190. Simultaneously, current is also delivered through synchronous rectifier 220 and inductor 230 in this particular state. Therefore, in this particular embodiment, a DC-to-DC converter has been illustrated that includes a first and second inductor path, the inductor paths being coupled in the converter to provide a single voltage output signal during converter operation. Likewise, in this embodiment, an array of switches are coupled to control the application of voltage sources to the inductor paths during the converter operation. The switches in the array are coupled so that their states are controlled, at least in part, based on the voltage signal level of the single voltage output signal during converter operation.

Because this is a ripple regulator in this embodiment, as previously described, the output signal of comparator 110 will eventually transition low when the voltage signal level of output voltage $V_O$ exceeds the reference voltage $V_{ref}$. As V1 transitions low, in this embodiment flip-flop 140 will change states so that the complement of the Q output port, QN, is high. Likewise, transistor 160 will be turned off due to the change in state of the Q output port of flip-flop 140. Synchronous FET 180 is turned on. Synchronous FET 220 remains on, so that current reaches the output port through both inductors and synchronous FETs. In this state, both high-side FETs, 160 and 250, are off. When $V_O$ drops below the reference threshold voltage of comparator 110, which; in this particular embodiment; includes hysteresis set by resistors 90 and 95, V1 will again transition high. V5 will transition high, which will turn on high-side transistor 250. Through inverter 210, synchronous transistor 220 is turned off so that high-side transistor 250 may deliver power to the load from the 12 volt power supply voltage source. Since V4 is low, synchronous transistor 180 will remain turned on by inverting FET driver 170. In this state, current is flowing simultaneously to the output port through transistor 180 and inductor 190, as well as through transistor 250 and inductor 230. The previously described oscillation cycle will repeat, alternatively taking power from the +5 volt voltage source and the +12 volt voltage source in this particular embodiment.

An embodiment of a method of producing an output voltage signal in accordance with the present invention is as follows. One of two voltage sources, such as a 5 volt source and a 12 volt source, is applied to an inductor circuit, such as the circuit illustrated in FIG. 1, to produce a voltage output signal. For example, as previously described, a 5 volt source may be applied. Likewise, while the 5 volt source is supplying power to produce the voltage output signal of the inductor circuit, the circuit may be performing synchronous rectification on the 12 volt source, for example, as previously described via inductor 230, while voltage source 5 volt supplies current. Eventually, the output voltage will achieve a predetermined maximum voltage level. This may be accomplished, for example, by using a voltage reference source. Once this occurs, the 5 volt source in this particular embodiment is no longer applied to supply current to the output voltage of the inductor circuit. During this period, synchronous rectification of both voltage sources continues to provide output power. Because a voltage source is no longer supplying power, the output voltage steadily declines. Eventually, the output voltage reaches a predetermined minimum voltage level. For the embodiment illustrated in FIG. 1, an array of switches are employed to control the application of the voltage sources to the inductor paths in the converter during converter operation. Therefore, once the output voltage reaches a minimum voltage level, the states of the switches are adjusted so that a 12 volt source is applied to the output voltage signal and inductor 190 is engaged in performing synchronous rectification. Therefore, the voltage source applied to the inductor circuit has been switched, based at least in part, on the voltage signal level of the output voltage signal. As previously described with respect to FIG. 1, a flip flop, such as flip flop 140, is employed in this particular embodiment to store the immediately preceding state of the DC-to-DC converter during converter operation. This storage device allows the converter to switch between the alternative voltage sources in this particular embodiment.

While certain features of the invention have been illustrated and described herein, many modifications, substitutions, changes and equivalents thereof will now occur to those skilled in the art. It is, therefore, to be understood that the appended claims are intended to cover all such modifications and changes as fall within the true spirit of the invention.

We claim:

1. A DC-to-DC converter comprising:

a first and a second inductor path;

said inductor paths being coupled in said converter so as to provide a single voltage output signal during converter operation;

an array of switches being coupled so as to control the application of voltage sources to said inductor paths during converter operation;

the switches in said array being coupled so that their states are controlled, at least in part, based upon the voltage signal level of the single voltage output signal during converter operation.

2. The DC-to-DC converter of claim 1, wherein each of the switches in said array comprises a transistor.

3. The DC-to-DC converter of claim 1, wherein said array comprises four switches.

4. The DC-to-DC converter of claim 3, and further comprising a voltage comparator;

the voltage comparator being coupled in said converter so as to receive the single voltage output signal and produce a feedback signal controlling, at least in part, the states of the switches in said array during converter operation.

5. The DC-to-DC converter of claim 4, wherein the switches are further coupled in said converter so that their states are further controlled, at least in part, by the immediately preceding state of the DC-to-DC converter during converter operation.

6. The DC-to-DC converter of claim 5, and further comprising a flip-flop, the flip-flop being coupled in said converter so as to store the immediately preceding state of said converter during converter operation.

7. The DC-to-DC converter of claim 6, wherein said four switches comprise synchronous rectifier switches;

each of said four synchronous rectifier switches being coupled to switch states during operation of said converter;

the feedback signal and flip-flop being coupled to control the state of said four synchronous rectifier switches so that during operation two of said four switches are off while the other two of said four switches are on.

8. The DC-to-DC converter of claim 1, wherein the application of voltage sources comprises the application of two voltage sources, each having a different voltage signal level.

9. A method of producing a voltage output signal comprising:

applying one of two voltages sources to an inductor circuit to produce a voltage output signal; and switching the voltage source applied based, at least in part, upon the voltage signal level of the voltage output signal.

10. The method of claim 9, wherein switching the voltage source applied based, at least in part, upon the voltage signal level of the voltage output signal includes switching the voltage source applied also based, at least in part, upon the immediately preceding voltage source applied.

11. The method of claim 9, wherein said inductor circuit includes a first and a second inductor path coupled in the circuit to provide the voltage output signal and an array of switches to control the application of the two voltage sources to the inductor paths.

12. The method of claim 11, wherein each of said switches comprises a transistor.

13. The method of claim 11, wherein switching the voltage source applied based, at least in part, on the voltage signal level of the voltage output signal includes:

comparing the voltage output signal with a reference voltage signal; and controlling the states of the switches in said array based, at least in part, on the result of the comparison.

14. The method of claim 11, wherein switching the voltage source applied based, at least in part, upon the voltage signal level of the voltage output signal includes switching the voltage source applied also based, at least in part, upon the immediately preceding voltage source applied.

15. The method of claim 14, wherein switching the voltage source applied based, at least in part, on the voltage signal level of the voltage output signal includes:

comparing the voltage output signal with a reference voltage signal; and controlling the states of the switches in said array based, at least in part, on the result of the comparison.

16. The method of claim 11, wherein said array comprises four switches.

17. The method of claim 9, wherein switching the voltage source applied based, at least in part, on the voltage signal level of the voltage output signal includes comparing the voltage output signal with a reference voltage signal.

* * * * *